United States Patent [19]

Braybrook

[11] 4,342,561
[45] Aug. 3, 1982

[54] POWER TRANSMISSION BELT

[75] Inventor: Kenneth A. Braybrook, Letchworth, England

[73] Assignee: Borg-Warner Corporation, Chicago, Ill.

[21] Appl. No.: 155,256

[22] Filed: Jun. 2, 1980

[51] Int. Cl.³ ............................ F16G 1/14; F16G 5/12
[52] U.S. Cl. ................................. 474/242; 474/264; 474/272
[58] Field of Search ............... 474/201, 244, 242, 264, 474/265, 272

[56] References Cited

U.S. PATENT DOCUMENTS

| 1,840,634 | 1/1932 | Nellis | 29/159.1 |
|---|---|---|---|
| 2,038,583 | 4/1936 | Maurer | 74/236 |
| 2,475,264 | 7/1949 | Sutton | 74/236 |
| 2,621,528 | 12/1952 | Luaces et al. | 474/265 |
| 2,724,278 | 11/1955 | Murray | 474/265 |
| 3,318,165 | 5/1967 | McAleer et al. | 74/230.7 |
| 3,416,383 | 12/1968 | Jansen et al. | 474/261 X |
| 3,523,462 | 8/1970 | Beindorf | 474/265 |
| 3,720,113 | 3/1973 | Van Doorue et al. | 474/201 |
| 3,949,621 | 4/1976 | Beusink | 74/231 M |
| 4,078,443 | 3/1978 | Warner et al. | 474/264 |

FOREIGN PATENT DOCUMENTS 2038990 7/1980 United Kingdom ................ 474/244

Primary Examiner—Allan D. Herrmann
Attorney, Agent, or Firm—Aubrey L. Burgess

[57] ABSTRACT

A flexible power transmission belt, especially adapted for use with drive blocks and pulley transmissions comprising a composite structure of metal bands, cord-like tension members and elastomer material, the latter being cured and maintaining the integrity of the composite structure.

2 Claims, 4 Drawing Figures

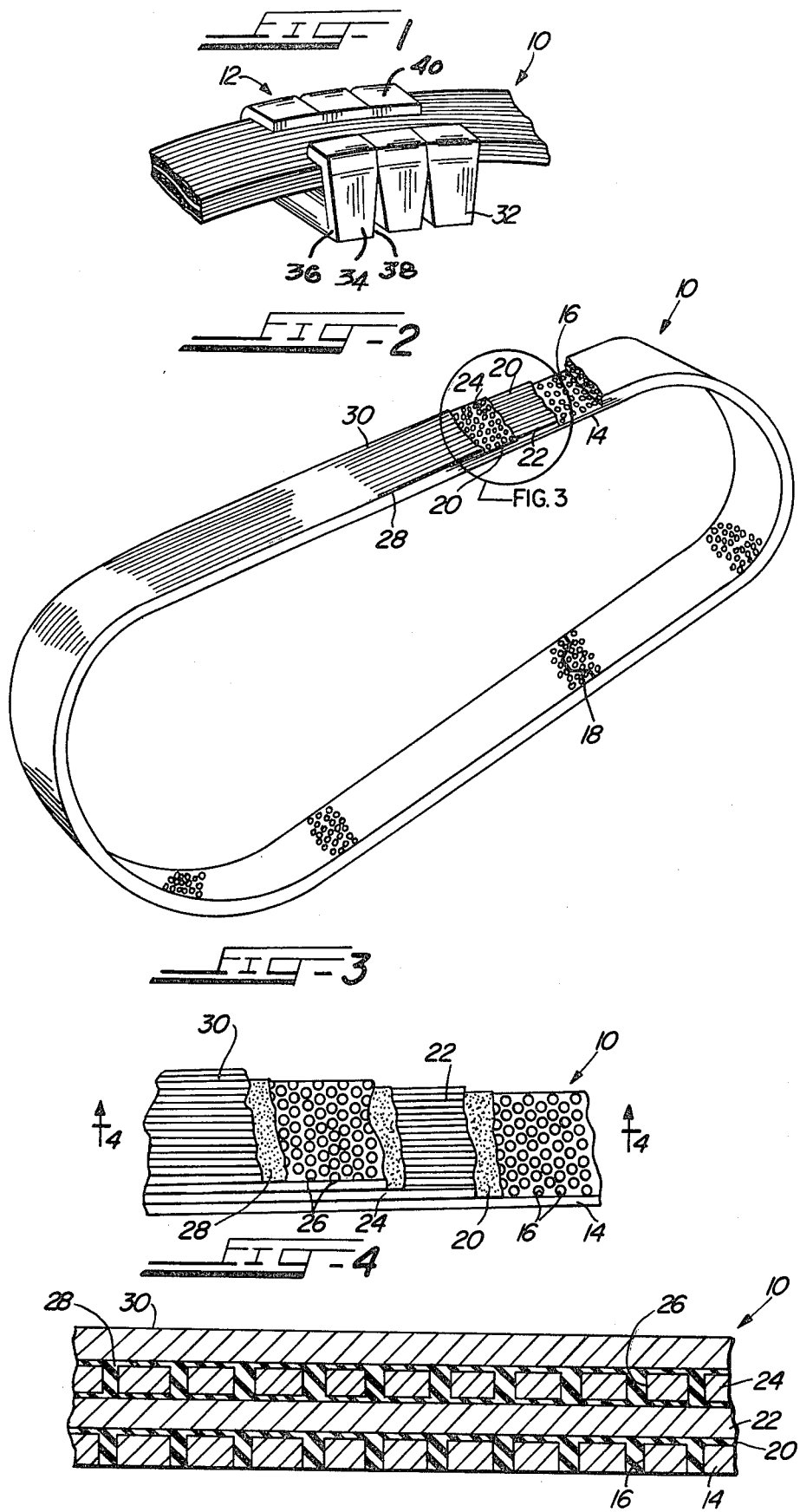

POWER TRANSMISSION BELT

BACKGROUND OF THE INVENTION

Flexible power transmission belts comprising an assembly of a plurality of superimposed steel strips and a plurality of V-shaped solid metal blocks are well known in the art. An example of such a construction is disclosed in U.S. Pat. No. 3,720,113 granted Mar. 13, 1973 to H. J. Van Doorne et al. In the patented structure the blocks are provided with lateral guides having relatively short top edges which overlie the steel strips to maintain the parts in assembled relationship.

Another example of a flexible power transmission belt is described in U.S. Pat. No. 3,949,621 granted Apr. 13, 1976 to Beusink, deceased, et al, in which solid metal plates are mounted on metal strips, the strips being received in slots in the lateral edges of the plates.

Other flexible power transmission belts comprising an assembly of links, pins and pulley contact members are described in U.S. Pat. Nos. 2,038,583, granted Apr. 28, 1936 to Maurer and 2,475,264, granted July 5, 1949 to Sutton.

THE INVENTION

The invention to be herein described relates to a flexible power transmission belt especially adaptable for use in pulley drives and, when drive blocks are attached as in the Van Doorne et al patent, supra, especially adaptable for the variable pulley type transmissions. The invention to be herein described is particularly related to the construction of the band part of the drive belts.

The drive band of this invention comprises a laminated structure of a first perforated metal strip with the ends joined together. A layer of an elastomer, such as uncured synthetic rubber covers the joined perforated metal strip and is in turn covered by a helical wind of a cord or cord-like tensile or tension member. The cord or cord-like member may be a solid steel wire, a stranded steel wire or fiberglass cord treated to adhere to the elastomer. Such treated fiberglass is used in the tire industry. Over the helical wind of the tensile member, there is another perforated metal band which is also covered by a layer of uncured elastomer. A second helical wind of the tensile member material covers the second layer of uncured elastomer. The assembly is treated to cure the elastomer layers; the elastomer flowing into the perforations of the strips and around each of the winds of the tensile member. Thus the assembly becomes an integral, flexible belt to which drive blocks can be attached if desired. In some uses, the drive blocks may not be necessary.

THE DRAWING

FIG. 1 is a partial perspective of a flexible power transmission belt according to this invention;

FIG. 2 is a perspective view of the band of FIG. 1;

FIG. 3 is an enlarged view of the circled area of FIG. 2; and

FIG. 4 is a sectional view of line 4—4 of FIG. 3.

DETAILED DESCRIPTION

Attention is now invited to FIGS. 1-4 of the drawing which illustrate a composite band 10 of a power transmission belt. The band 10 comprises a first metal band 14, usually of steel, having a plurality of perforations 16, the latter being generally uniformly spaced from each other. The ends of the band 14 are joined as by welding with a dovetailed joint 18. A first layer 20 of elastomer, such as uncured synthetic rubber, is supported on the surface of the band 14 and a tensile member 22, as for example, solid steel wire, stranded steel wire or fiberglass strand treated to adhere to synthetic rubber is wound, in a helical wind over the first layer 20 of elastomer. A second, metal band 24 also usually of steel, surrounds the tensile member 22 and, like the band 14, has a plurality of generally uniformly spaced perforations 26. The ends of the band 24 are joined in a manner similar to the joint 18; the joint not being illustrated for the sake of clarity. A second layer 28 of elastomer, such as uncured synthetic rubber is supported on the second band 24 and a second tensile member 30 is wound, in a helical wind over the elastomer layer 28. The tensile member 30 is selected from the group of materials used for the first tensile member 22.

Upon curing the elastomer layers, the synthetic rubber fills the perforations and the interstices between the winds of the tensile members. Generally trapezoidal drive blocks 32 can be attached to the composite belt in any usual manner. As illustrated the drive blocks 32 have converging side surfaces 34 to engage the flanges of V-pulleys such in a variable pulley transmission. Also the faces 36, 38 are tapered to permit articulation of the belt 10. The drive blocks 32 as shown have upper wing members 40 overlying the top surface of the band. Two such belts can be used, if desired, in a structure as described in the Beusink, deceased, et al patent, supra. Also, the belt 10 can be used for connecting flat pulleys; in such cases, no drive blocks are necessary.

If required, the ends of the tensile members 20 and 30, respectively, can be hooked together to prevent cord unravelling.

I claim:

1. A composite power transmission belt especially adapted to drivingly interconnect the pulleys of a pulley transmission, comprising:
    first and second continuous metal bands, each having a plurality of perforations therethrough;
    a first elastomer layer between said metal bands with elastomer portions in the perforations of each band;
    a first helically wound tensile member in said first elastomer layer and between said metal bands;
    a second helically wound tensile member on the outside of one of said metal bands; and
    a second elastomer layer on said second helically wound tensile member.

2. A composite power transmission belt as recited in claim 1, further comprising a plurality of generally trapezoidal drive blocks attached to said belt, each drive block having edges adapted to drivingly engage the flanges of the pulleys.

* * * * *